(12) United States Patent
Nishikuni et al.

(10) Patent No.: US 8,478,027 B2
(45) Date of Patent: Jul. 2, 2013

(54) IMAGE PROCESSING APPARATUS, IMAGE REPRODUCING SYSTEM AND COMPUTER-READABLE MEDIUM

(75) Inventors: Yuichi Nishikuni, Ebina (JP); Akihiro Ito, Ebina (JP); Hidetoshi Kawashima, Ebina (JP); Toshio Koriyama, Ebina (JP); Toshie Kobiyama, Saitama (JP); Kiyoshi Une, Saitama (JP)

(73) Assignee: Fuji Xerox Co., Ltd., Tokyo (JP)

(*) Notice: Subject to any disclaimer, the term of this patent is extended or adjusted under 35 U.S.C. 154(b) by 936 days.

(21) Appl. No.: 11/935,431

(22) Filed: Nov. 6, 2007

(65) Prior Publication Data
US 2008/0107332 A1 May 8, 2008

(30) Foreign Application Priority Data

Nov. 6, 2006 (JP) .................................. 2006-300293
Sep. 7, 2007 (JP) .................................. 2007-233030

(51) Int. Cl.
*G06K 9/00* (2006.01)
(52) U.S. Cl.
USPC ............................................. 382/162
(58) Field of Classification Search
None
See application file for complete search history.

(56) References Cited

U.S. PATENT DOCUMENTS

2003/0107772 A1 6/2003 Shimazaki et al.
2004/0228523 A1 11/2004 Hibi et al.
2006/0096483 A1 5/2006 Andreas et al.
2006/0146196 A1 7/2006 Suenaga et al.

FOREIGN PATENT DOCUMENTS

| JP | 200227266 A | 1/2002 |
| JP | 2003-134350 A | 5/2003 |
| JP | 2003-136683 A | 5/2003 |
| JP | 2004-236199 A | 8/2004 |
| JP | 2004-343366 A | 12/2004 |
| JP | 2005-117220 A | 4/2005 |
| JP | 2006-505970 A | 2/2006 |
| WO | 2004/077837 A1 | 9/2004 |

OTHER PUBLICATIONS

Notification of Reasons for Refusal dated Feb. 23, 2011, in Japanese Application No. 2007-233030.
Japanese Office Action issued on Dec. 6, 2011 in the corresponding Japanese Patent Application No. 2007-233030.

*Primary Examiner* — Samir Ahmed
(74) *Attorney, Agent, or Firm* — Sughrue Mion, PLLC

(57) ABSTRACT

An image processing apparatus includes a storage unit, a judgment unit and a conversion unit. The storage unit stores a reference color characteristic. The judgment unit judges as to whether or not a difference between an input color characteristic that is a color characteristic of input image data and the reference color characteristic is equal to or less than a predetermined threshold value. The conversion unit converts the input image data into a color characteristic that can be reproduced by an image reproducing apparatus, based on the reference color characteristic if the difference is equal to or less than the predetermined threshold value.

14 Claims, 7 Drawing Sheets

IMAGE PROCESSING APPARATUS, IMAGE REPRODUCING SYSTEM AND COMPUTER-READABLE MEDIUM

CROSS-REFERENCE TO RELATED APPLICATIONS

This application is based on and claims priority under 35 U.S.C. §119 from Japanese Patent Application Nos. 2006-3000293 (filed on Nov. 6, 2006) and 2007-233030 (filed on Sep. 7, 2007).

BACKGROUND

1. Technical Fields

The invention relates to an image processing apparatus, an image reproducing system, and a computer-readable medium.

2. Related Art

Image data output from a digital camera or the like is often premised on that it is reproduced based on a standard color space such as sRGB. However, there are other cases where such image data is premised on that it is reproduced based on a color space, such as AdobeRGB, having broader color reproduction range than the standard color space. Thus, the following technique has been proposed. That is, color-space identification information is attached to image data in advance and reproduction image data is generated based on the color space designated by the color-space identification information.

SUMMARY

According to an aspect of the invention, an image processing apparatus includes a storage unit, a judgment unit and a conversion unit. The storage unit stores a reference color characteristic. The judgment unit judges as to whether or not a difference between an input color characteristic that is a color characteristic of input image data and the reference color characteristic is equal to or less than a predetermined threshold value. The conversion unit converts the input image data into a color characteristic that can be reproduced by an image reproducing apparatus based on the reference color characteristic if the difference is equal to or less than the predetermined threshold value.

BRIEF DESCRIPTION OF THE DRAWINGS

Exemplary embodiments of the invention will be described in detail below with reference to the accompanying drawings, wherein.

DETAILED DESCRIPTION

Hereinafter, exemplary embodiments of the invention will be described with reference to the drawings.

Figure 1:
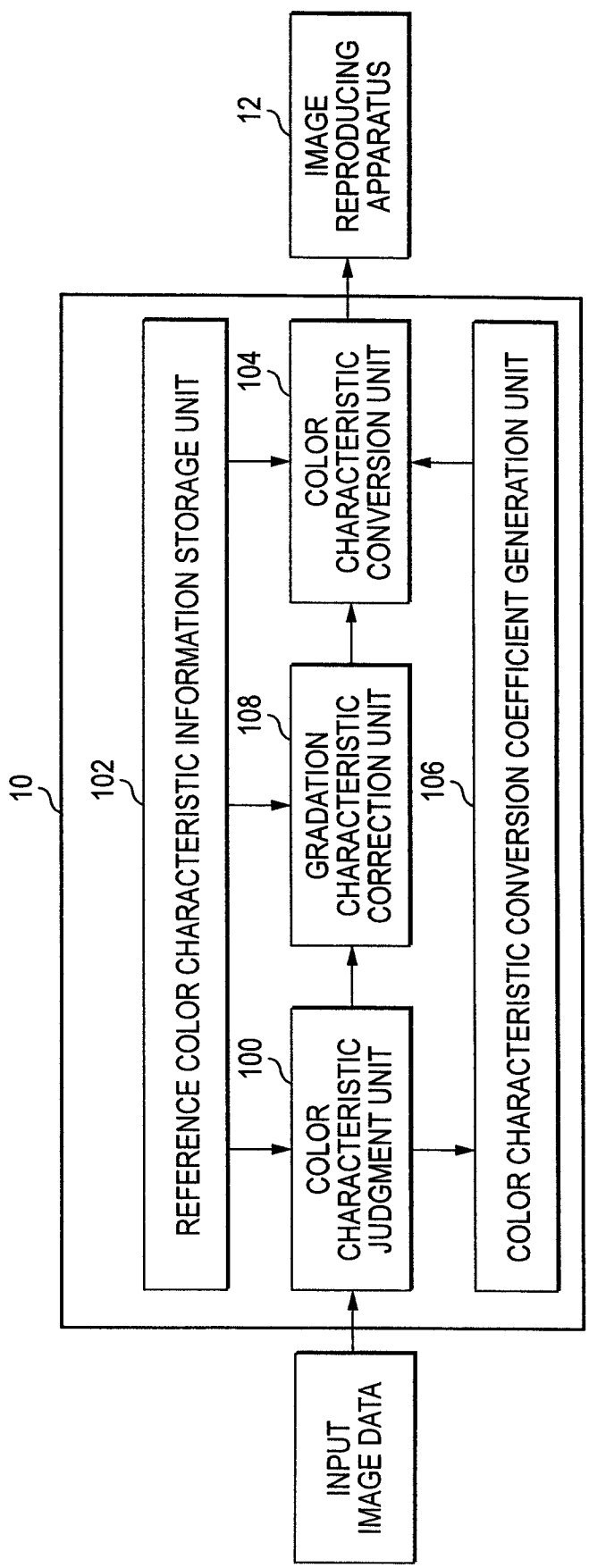
FIG. 1 is a functional block diagram of an image reproducing system according to an exemplary embodiment of the invention.

FIG. 1 shows a functional block diagram illustrating an image reproducing system according to an exemplary embodiment of the invention. In FIG. 1, the image reproducing apparatus includes an image processing apparatus 10 and an image reproducing apparatus 12. The image processing apparatus 10 selects a color characteristic suitable for image data acquired from an image data generation device such as a digital camera and generates reproduction image data. Also, the image reproducing apparatus 12 includes a print device, an image display device, and the like and reproduces and outputs the reproduction image data acquired from the image processing apparatus 10.

The image processing apparatus 10 includes a color characteristic judgment unit 100, a reference color characteristic information storage unit 102, a color characteristic conversion unit 104, a color characteristic conversion coefficient generation unit 106, and a gradation characteristic correction unit 108.

The color characteristic judgment unit 100 is implemented by a central processing unit (CPU) and a program that controls a processing operation of the CPU. The color characteristic judgment unit 100 judges as to whether or not an input color characteristic matches a reference color characteristic by judging as to whether a specific color characteristic (the input color characteristic) is attached to input image data and by, when the specific color characteristic is attached, comparing the input color characteristic with the reference color characteristic (described later) stored in the reference color characteristic information storage unit 102. The color characteristic is a characteristic value of a color space that is designated when image data is generated. Also, the color characteristic judgment unit 100 judges as to whether or not a reproduction gradation characteristic of the input image data is different from a reproduction gradation characteristic of the reference color characteristic.

The reference color characteristic information storage unit 102 is implemented by a read-only memory (read-only storage device ROM), a hard disk device and/or other computer-readable storage devices. The reference color characteristic information storage unit 102 stores information relating to a general color space such as sRGB, AdobeRGB, and CMYK, as reference color characteristic information.

The color characteristic conversion unit 104 is implemented by the CPU and a program that controls a process operation of the CPU. The color characteristic conversion unit 104 converts the input image data into a color characteristic that can be reproduced by the image reproducing apparatus 12.

The color characteristic conversion coefficient generation unit 106 is implemented by the CPU and a program that controls a process operation of the CPU. If the input color characteristic does not match any of the reference color characteristics stored in the reference color characteristic information storage unit 102, the color characteristic conversion coefficient generation unit 106 generates color characteristic conversion coefficients for converting the input image data into a color characteristic that can be reproduced by the image reproducing apparatus 12. The color characteristic conversion coefficients are generated based on the input color characteristic and the color characteristic that can be reproduced by the image reproducing apparatus 12, and is used for the color characteristic conversion unit 104 to convert the input image data.

The gradation characteristic correction unit 108 is implemented by the CPU and a program that controls a process operation of the CPU. If the reproduction gradation characteristic of the input color characteristic is different from that of the reference color characteristic, the gradation characteristic correction unit 106 corrects the reproduction gradation characteristic of the input color characteristic.

Figure 2:
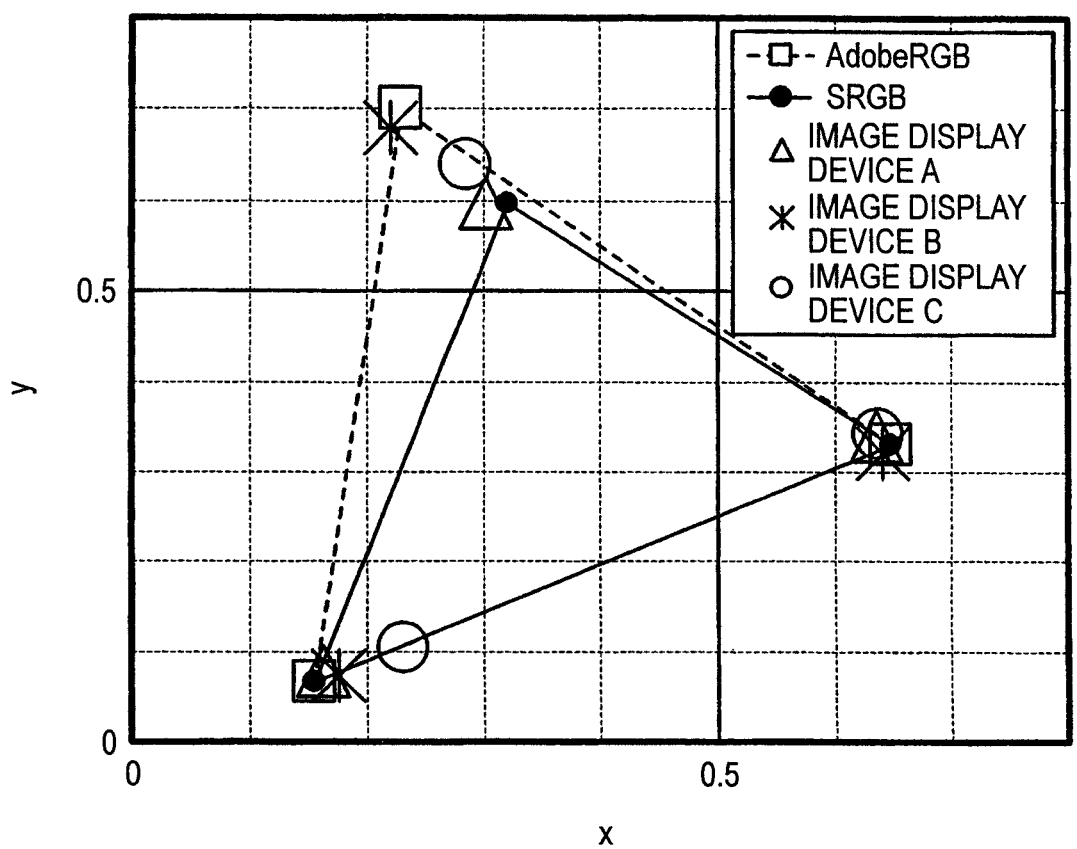
FIG. 2 is an explanatory diagram illustrating an example of a method for judging an input color characteristic.

FIG. 2 shows an explanatory diagram illustrating a method performed by the color characteristic judgment unit 100 to discriminate (judge) the input color characteristic. In FIG. 2, the white quadrangles (□) represent primary-color chromaticity points of AdobeRGB color space which is a reference color characteristics. The black circlets (●) represent primary-color chromaticity points of sRGB color space. The primary colors are defined as red (R), green (G), and blue (B). Such information is stored in the reference color characteristic information storage unit 102.

In addition, the white triangles (△) represent primary-color chromaticity points of a image display device A on which the input image data was displayed before being input to the image processing apparatus 10. The asterisks (*) represent primary-color chromaticity points of an image display device B. The white circlets (○) represent primary-color chromaticity points of an image display device C. These signs represent input color characteristics, respectively. In this exemplary embodiment, there are three image display devices on which the input image data was displayed before being input to the image processing apparatus 10. However, the number of image display devices is not limited to three. Also, there is a premise that the color characteristics (input color characteristics) of the image display devices are attached to the input image data as the primary-color chromaticity points.

The color characteristic judgment unit 100 compares the primary-color chromaticity points of the image display devices with the primary-color chromaticity points of the reference color characteristics shown in FIG. 2, and judges differences therebetween. In the example of FIG. 2, the differences are represented by whether or not the primary-color chromaticity points match. The color characteristic judgment unit 100 recognizes the differences as differences between values representing chromaticity. The difference between the values representing the chromaticity is a difference between distances shown in the xy chromaticity drawing of FIG. 2. Tables 1(a) and 1(b) show difference values. Table 1(a) shows the difference values between the primary-color chromaticity points of the sRGB color space and the primary-color chromaticity points of the image display devices A, B, and C. Table 1(b) shows the difference values between the primary-color chromaticity points of the AdobeRGB color space and the primary-color chromaticity points of the image display devices A, B, and C.

TABLE 1(a)

| COLOR | sRGB-A | sRGB-B | sRGB-C |
|---|---|---|---|
| R | 0.017 | 0.014 | 0.016 |
| G | 0.019 | 0.130 | 0.056 |
| B | 0.015 | 0.021 | 0.084 |

TABLE 1(b)

| COLOR | Adobe-A | Adobe-B | Adobe-C |
|---|---|---|---|
| R | 0.017 | 0.014 | 0.016 |
| G | 0.126 | 0.024 | 0.082 |
| B | 0.015 | 0.021 | 0.084 |

The color characteristic judgment unit 100 judges as to whether the difference values are not more than a predetermined threshold value. If the difference values are not more than the predetermined threshold value and if the color characteristic judgment unit 100 determines that the respective primary-color chromaticity points match each other and determines that all the primary-color chromaticity points match each other, the color characteristic judgment unit 100 determines that the reference color characteristics matches the input color characteristics of the input image data displayed on an image display device in question. In the example of Tables 1(a) and 1(b), if the threshold value is set to 0.03, the color characteristic of the image display device A matches the sRGB color space but does not match the AdobeRGB color space. Also, the color characteristic of the image display device B matches the AdobeRGB color space but does not match the sRGB color space. Further, the color characteristic of the image display device C does not match any of them.

The judgment is performed for each of the three primary-color chromaticity points. However, the judgment may be performed based on an average of the difference values at the three primary-color chromaticity points or may be performed based on one specific chromaticity (for example, only G) Also, the judgment may be performed based on a chromatic coordinate value of a reference white point, chromatic coordinate values of primary colors or color characteristic conversion coefficients used to convert into a specific color space such as L*a*b*. In these cases, appropriate threshold values are set to perform the judgment processes, respectively.

Figure 3:
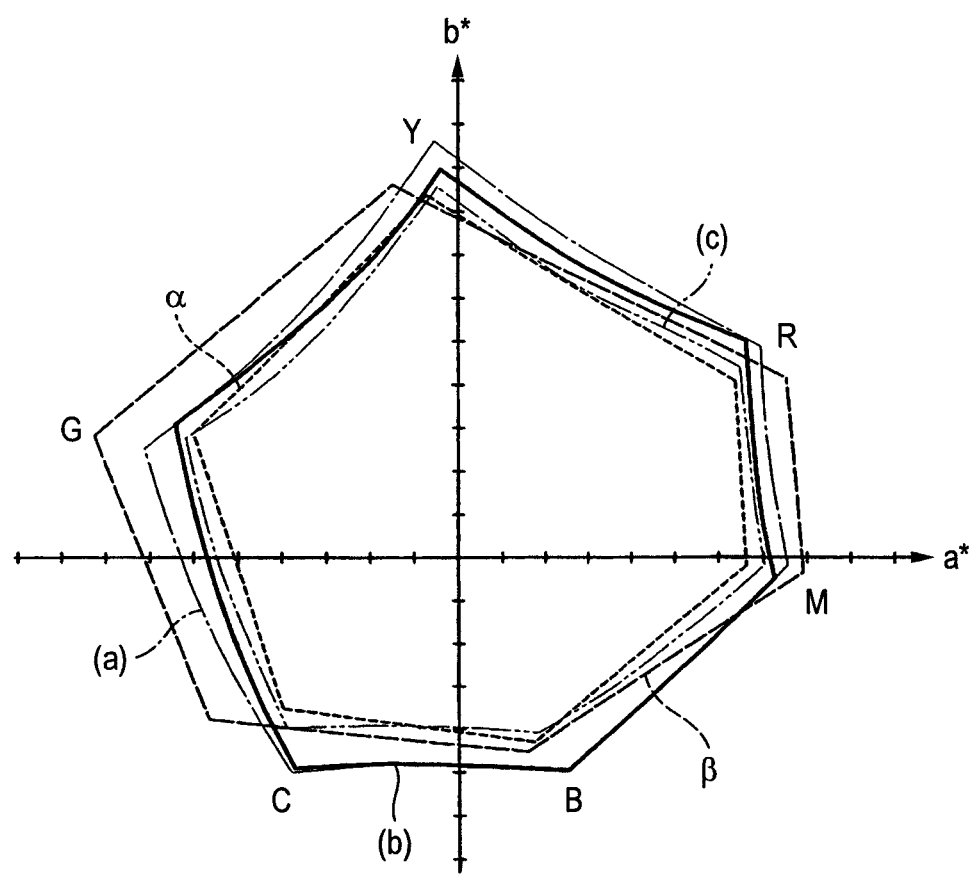
FIG. 3 is an explanatory diagram illustrating another example of the method for judging an input color characteristic.

FIG. 3 shows an explanatory diagram illustrating another method performed by the color characteristic judgment unit 100 to discriminate (judge) the input color characteristic. FIG. 3 illustrates a*b* plane in L*a*b* color space, and shows represents three examples (a), (b), and (c) of a representative reference color characteristic of CMYK. The example (a) represents an area surrounded by the dashed-dotted lines, the example (b) represents an area surrounded by the solid lines, and the example (c) represents an area surrounded by the double-dashed dotted lines. These reference color characteristics represent color reproduction ranges that are reproduced by a CMYK color space defined by Japan-Color2001. In FIG. 3, the horizontal axis represents a* axis, and the vertical axis represents b* axis. Also, vertexes of the areas defined by respective hexagonal shapes are specific color signals represented by saturation signals or a combination of them. The upper vertex in the drawing is Y (yellow), and the other vertexes are R (red), M (magenta), B (blue), C (cyan) and G (green) in a clockwise direction thereof. C, M and Y are the primary colors, and R (mixing Y with M at 100%), G (mixing Y with C at 100%), and a (mixing C with M at 100%) are the secondary colors.

When one represented by, for example, the dotted line α and the broken line β are designated as the input color characteristics of the input image data, the color characteristic judgment unit 100 judges as to whether or not a difference between each vertex of the input color characteristics and each vertex of the reference color characteristics is not more than a predetermined threshold value. In this case, the color characteristic judgment unit 100 may judge as to whether an angle formed by straight lines that connect (i) the origin, which is the intersection point between a* axis and b* axis, and (ii) the respective vertexes, that is, whether or not a hue difference is not more than the threshold value. Instead of the hue difference, the color characteristic judgment unit 100 may judge based on a color difference that is a distance on the L*a*b* color space in which L axis (brightness component) is added to a* axis and b* axis in FIG. 3 The threshold value is set for each of specific color signals corresponding to the six vertexes. Also, the judgment using the threshold values may be performed for all or a part of the specific color signals corresponding to the six vertexes.

Since the dotted line α is similar to the reference color characteristic (c), the color characteristic conversion unit 104 converts the input image data into the color characteristic that can be reproduced by the image reproducing apparatus, using color conversion coefficients that are stored in the reference color characteristic information storage unit 102 in advance for (C). Also, since the broken line β are greatly different from any one of the reference color characteristics (a), (b), and (c), the color characteristic conversion coefficient generation unit 106 generates color conversion coefficients suitable for characteristic of the broken line β. Then, the color characteristic conversion unit 104 converts the input image data into the color characteristic that can be reproduced by the image reproducing apparatus 12, based on the generated color conversion coefficients.

Color Components for which the judgment is performed are not limited to the six colors shown in FIG. 3, but may be colors represented by a combination of the respective saturation signals, for example, a tertiary color, a quaternary color, or the like.

Figure 4:
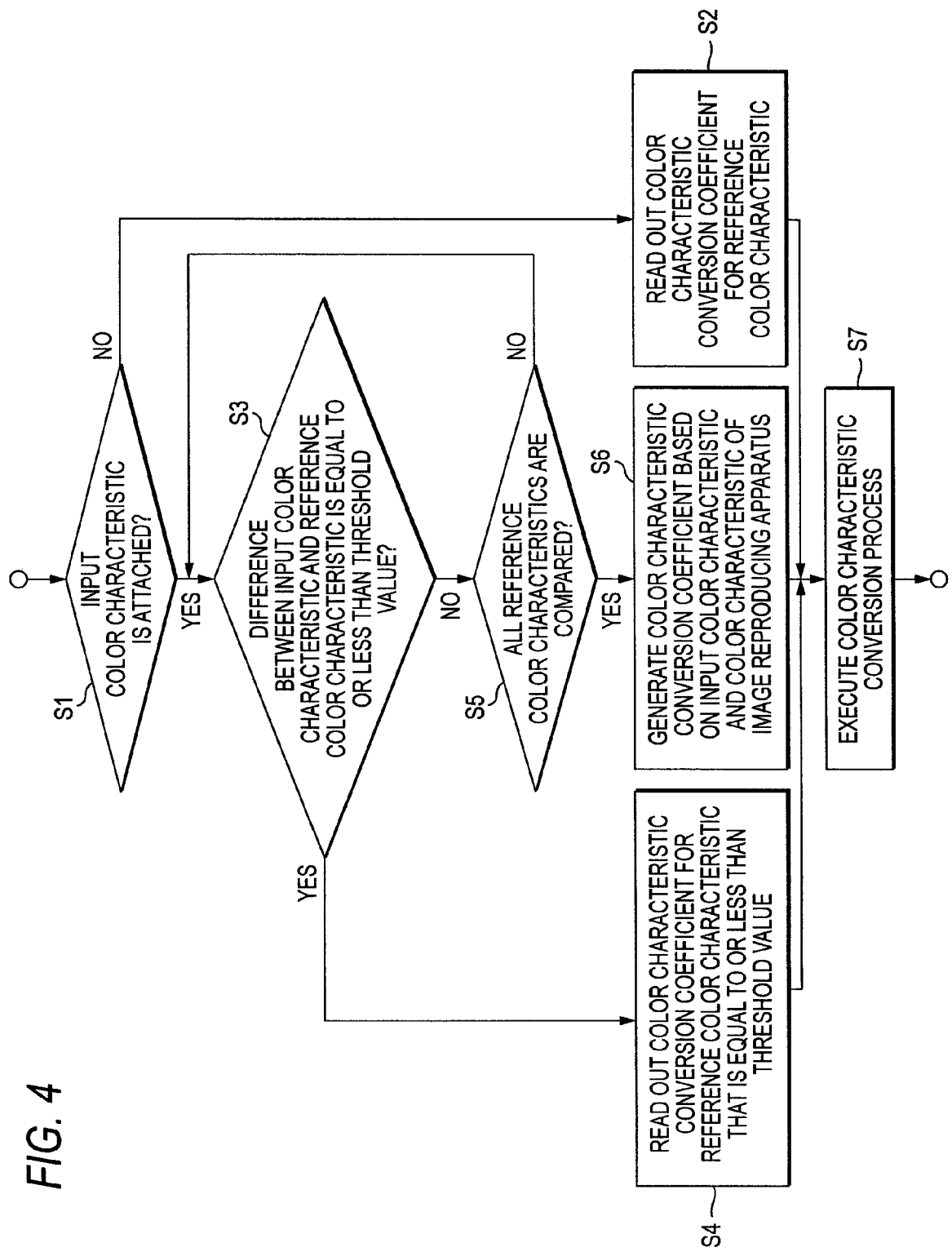
FIG. 4 is a flow chart of an operation example of the image processing apparatus according to the exemplary embodiment of the invention.

FIG. 4 shows a flow chart illustrating an operation example of the image processing apparatus 10 according to the exemplary embodiment. In FIG. 4, the color characteristic judgment unit 100 judges as to whether the input color characteristic is attached to the input image data (S1).

In S1, if the input color characteristic is not attached to the input image data, predetermined reference color characteristics for example, the color characteristic conversion coefficients for the sRGB color space are read out from the reference color characteristic information storage unit 102 to the color characteristic conversion unit 104 (S2). The color characteristic conversion coefficients are coefficients for converting image data in the sRGB color space into color characteristic, for example, the CMYK color space, that can be reproduced by the image reproducing apparatus 12. Thus, the conversion process is performed by the color characteristic conversion unit 104 for the input image data with the input image data being assumed to have the predetermined reference color characteristic such as the sRGB color space.

Also, in S1, when the input color characteristic is attached to the input image data, the color characteristic judgment unit 100 judges as to whether a difference between the input color characteristic of the input image data and some of the reference color characteristics is not more than the predetermined threshold values by the method as described with reference to FIG. 2 or 3 (S3).

In the step S3, when the difference is not more than the threshold value, the color characteristic conversion coefficients for the reference color characteristic that has the difference less than the threshold value is read out from the reference color characteristic information storage unit 102 to the color characteristic conversion unit 104 (S4).

Meanwhile, in S3, if the difference is more than the threshold value, another reference color characteristic is compared with the input color characteristic. As a result, if the differences between all the reference color characteristics and the input color, characteristic are more than the threshold value after the input color characteristic is compared with all the reference color characteristics (S5), the color characteristic conversion coefficient generation unit 106 generates color characteristic conversion coefficients suitable for the input color characteristic, based on the input color characteristic and the color characteristic that can be reproduced by the image reproducing apparatus 12 (S6). The input color characteristic includes color characteristic conversion coefficients between the input color characteristic and a specific color space such as L*a*b* color space that does not generally depend on the image reproducing apparatus 12. Also, color characteristic conversion coefficients between a color characteristic of the image reproducing apparatus 12 and the specific color space such as L*a*b* color space and color characteristics such as AdobeRGB, sRGB, and CMYK that can be reproduced by the image reproducing apparatus 12 are known in advance. Thus, the color characteristic conversion coefficient generation unit 106 firstly converts the input color characteristic into a device independent color space such as L*a*b* color space, and then generates color characteristic conversion coefficients for converting the device independent color apace into the color space that is used by the image reproducing apparatus 12.

Next, the color characteristic conversion unit 104 performs a process of converting the input image data into the color characteristic that can be reproduced by the image reproducing apparatus 12, using the color characteristic conversion coefficients obtained in S2, S4 or S6 (S7).

According to the steps mentioned above, the color characteristic to be used in response to the input image data can be selected.

Figure 5A:
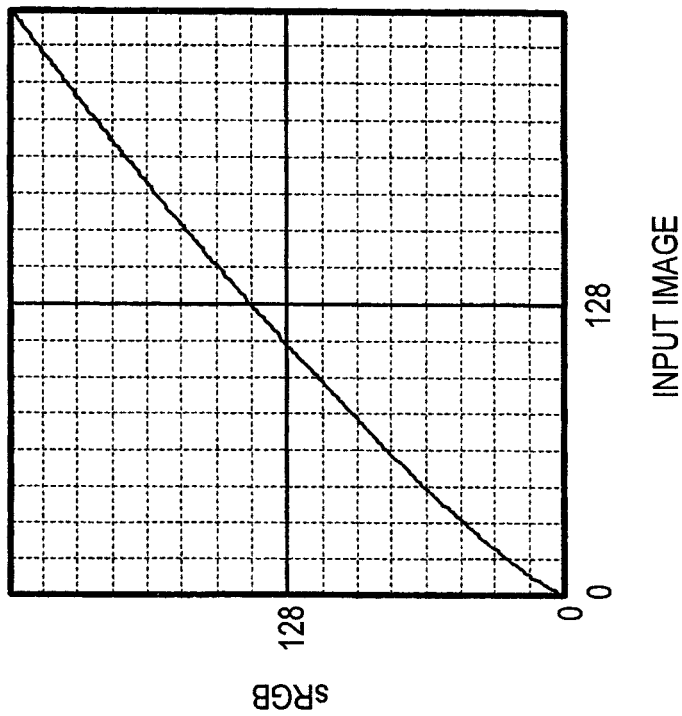
FIG. 5 is an explanatory diagram illustrating a method for correcting a reproduction gradation characteristic attached to input image data.
Figure 5B:
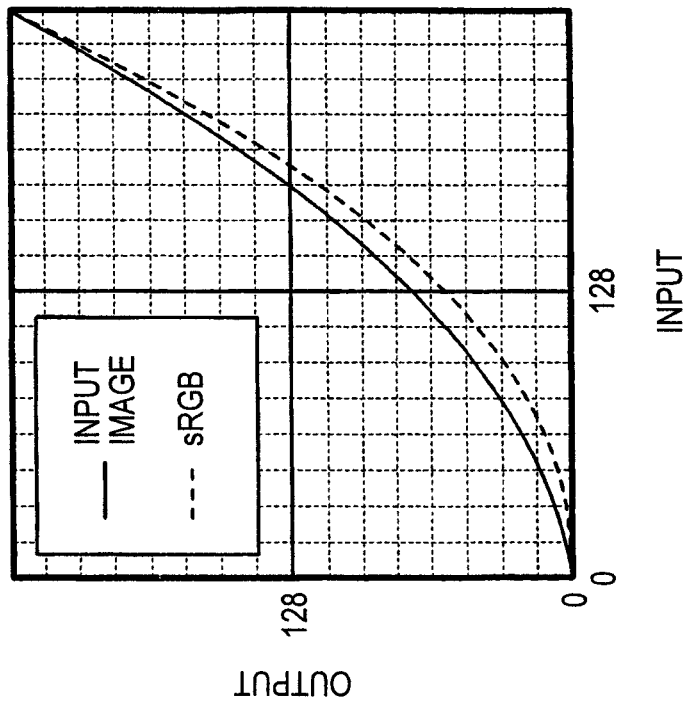

FIGS. 5A and 5B show an explanatory diagram illustrating a method for correcting a reproduction gradation characteristic attached to the input image data. This method is applied if the color characteristic judgment unit 100 determines that the difference between a primary color chromaticity point of an image display device on which the input image data was displayed and a primary-color chromaticity point of any one of the reference color characteristics is not more than the predetermined threshold value.

In order to reproduce an intermediate color among the respective primary colors (RGB), a reproduction gradation characteristic of an image display device on which the input image data was displayed before being input to the image processing apparatus 10 is attached to the input image data. When the reproduction gradation characteristic of the input image data is different from the reproduction gradation characteristic of the above reference color characteristic, it is difficult to output proper image data to the image reproducing apparatus 12. Thus, the gradation characteristic correction unit 106 corrects the reproduction gradation characteristic of the input image data so as to match the reproduction gradation characteristic of the reference color characteristic, which is judged by the color characteristic judgment unit 100 to match.

In FIG. 5A, the reproduction gradation characteristic of the image display device on which the input image data was displayed is represented by the solid line, and the reproduction gradation characteristic of the sRGB color space which is the reference color characteristic is represented by the broken lines. In an example shown in FIG. 5A, there is a deviation between the reproduction gradation characteristic of the input image data and the reproduction gradation characteristic of the sRGB color space. A curve of the reproduction gradation characteristic of the sRGB color space is defined with gamma value of 2.2 while another gamma value is defined in the image display device on which the input image data was displayed, and thereby this deviation occurs. Thus, the gradation characteristic correction unit 108 generates a correction curve as shown in FIG. 5B based on a relationship between the reproduction gradation characteristic of the input image data and the reproduction gradation characteristic of the sRGB color space, and performs a correction process by multiplying the input image data by the generated correction curve.

Figure 6A:
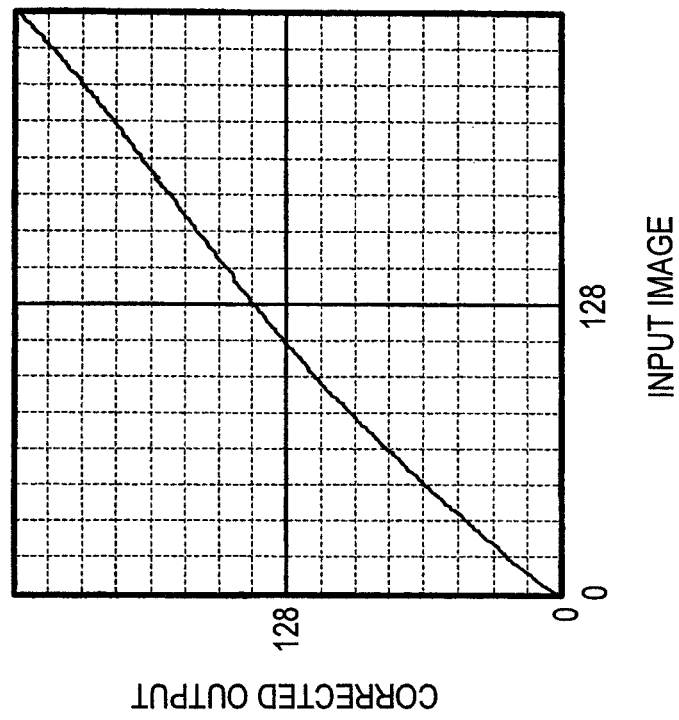
FIG. 6 is an explanatory diagram illustrating another method for correcting the reproduction gradation characteristic attached to the input image data.
Figure 6B:
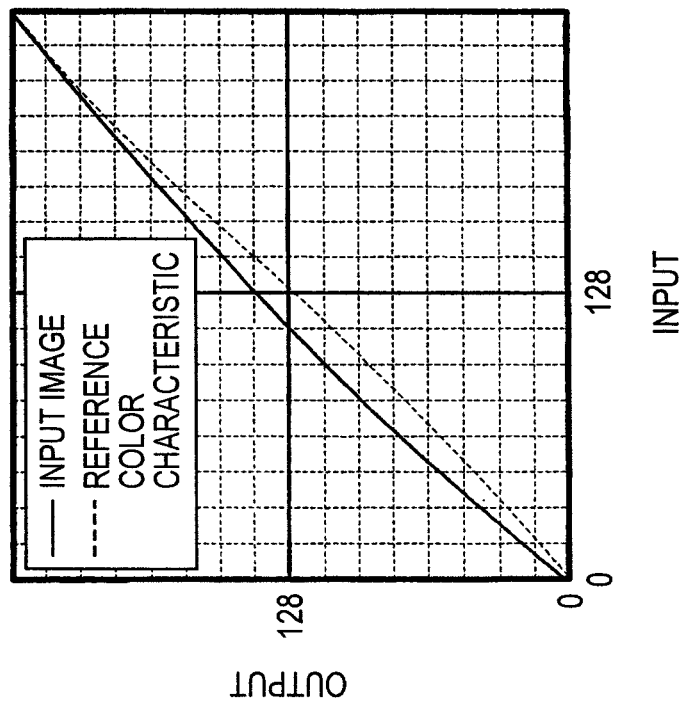

FIGS. 6A and 6B show an explanatory diagrams illustrating another method for correcting the reproduction gradation characteristic attached to the input image data. In this example, the CMYK color space is set as the input color characteristic of the input image data. Likewise, this method is applied if the color characteristic judgment unit 100 determines that a difference between the input color characteristic and any one of the reference color characteristics is not more than the predetermined threshold value. In FIG. 6A, the reproduction gradation characteristic off the input image data is represented by the solid liner and the reproduction gradation characteristic of the reference color characteristic (for example, CMYK color space defined by JapanColor2001) is represented by the broken lines. In this example, the reproduction gradation characteristic of the primary color (for example, Y) is employed. In the example shown in FIG. 6A, there is a deviation between the reproduction gradation characteristic of the input image data and the reproduction gradation characteristic of the reference color characteristic. Then, the gradation characteristic correction unit 108 generates a correction curve shown in FIG. 6B based on a relationship between the reproduction gradation characteristic of the input image data and the reproduction gradation characteristic of the reference color characteristic, and performs a correction process by multiplying the input image data by the generated correction curve.

Figure 7:
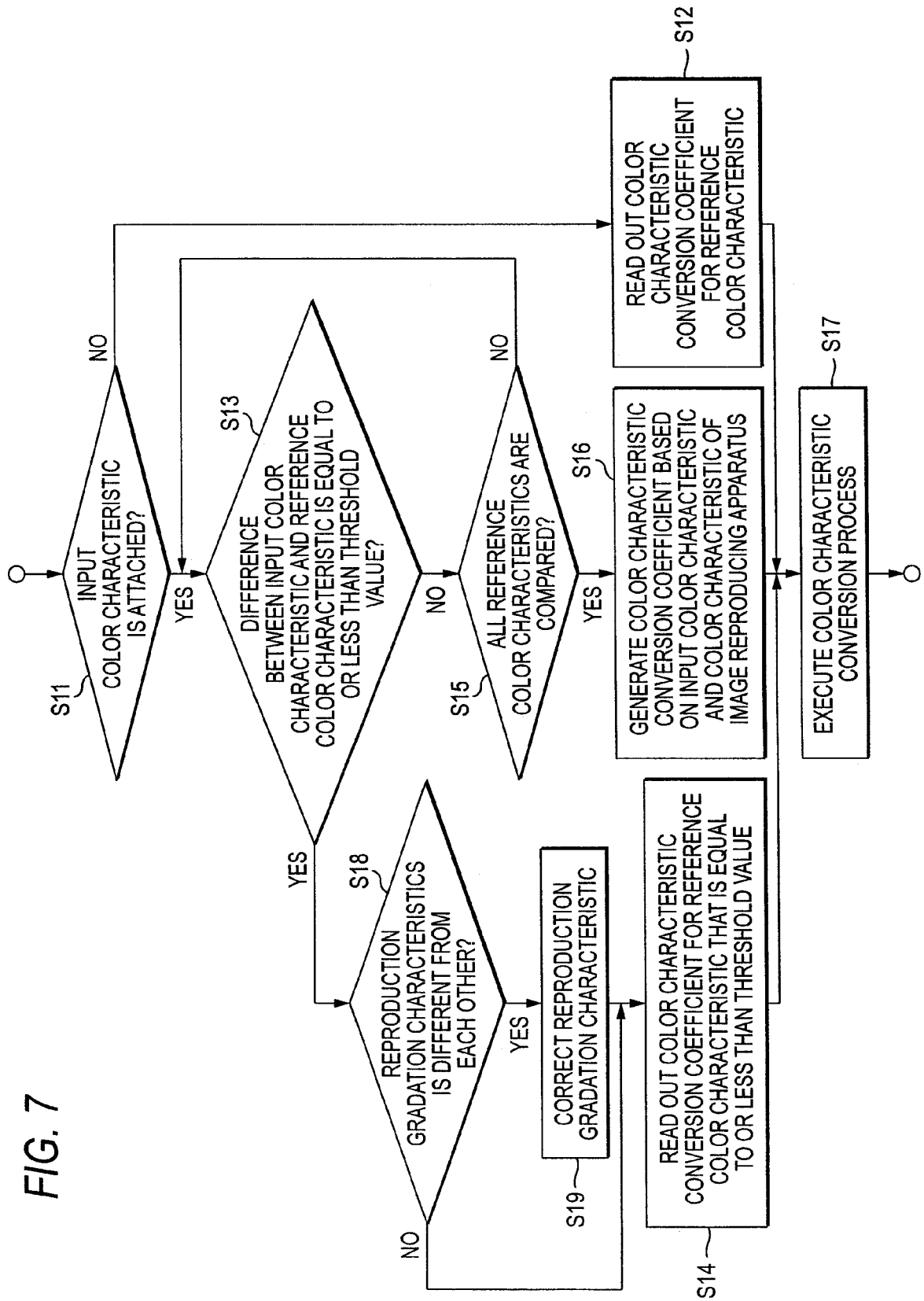
FIG. 7 is a flow chart of another operation example of the image processing apparatus according to the exemplary embodiment of the invention.

FIG. 7 shows a flow chart illustrating another operation example of the image processing apparatus 10 according to the exemplary embodiment. Here, S11 to S17 in FIG. 7 are the same as S1 to S7 in FIG. 4, and thus the description of those steps will be omitted.

In FIG. 7, if the difference between the input color characteristic of the input image data and any one of the reference color characteristics is not more than the predetermined threshold value (S13), the color characteristic judgment unit 100 judges as to whether or not the reproduction gradation characteristic of the input image data is different from the reproduction gradation characteristic of the reference color characteristic (for example, the sRGB color space, the CMYK color space defined by JapanColor2001, and the like) (S18). In S18, if the two reproduction gradation characteristics are different from each other, the gradation characteristic correction unit 108 corrects the reproduction gradation characteristic of the input image data by the method as described with reference to FIGS. 5A and 5B or FIGS. 6A and 6B (S19). After the reproduction gradation characteristic of the input image data is corrected, the color characteristic conversion unit 104 converts the input image data into the color characteristic that can be reproduced by the image reproducing apparatus 12, based on the color characteristic conversion coefficients obtained in S14 (S17). In S18, if the two reproduction gradation characteristics are not different from each other, the correction process of the reproduction gradation characteristic in S19 is not performed.

Consequently, it is possible to output the image data obtained by appropriately correcting the reproduction gradation characteristic of the input image data, to the image reproducing apparatus 12.

What is claimed is:

1. An image processing apparatus comprising:
   a storage unit that stores reference color conversion coefficients that convert image data of a reference color space to image data of an output color space;
   a judgment unit that judges whether differences between primary-color chromaticity points of an input color space of input image data and corresponding primary-color chromaticity points of reference color characteristics of the reference color space are equal to or less than a predetermined threshold value; and
   a conversion unit that converts the input image data of the input color space into output image data of the output color space using the reference color conversion coefficients for a reference color characteristic having the differences equal to or less than the predetermined threshold value, in response to the judgment unit judging that the differences are equal to or less than the predetermined threshold value.

2. The image processing apparatus according to claim 1, further comprising:
   a generation unit that generates a color characteristic conversion coefficient that converts the input image data of the input color space into the output image data of the output color space, based on the input color space and a color space of an image reproducing apparatus that reproduces the input image data, in response to the judgment unit judging that the differences are not equal to or less than the predetermined threshold value.

3. The image processing apparatus according to claim 1, wherein the threshold value is defined for each of the reference color characteristics.

4. The image processing apparatus according to claim 1, wherein the threshold value is defined for chromaticity of a specific color signal in the input color space and chromaticity of the specific color signal in the reference color space.

5. The image processing apparatus according to claim 1, further comprising:
   a correction unit that corrects a reproduction gradation characteristic of the input color space if the reproduction gradation characteristics of the input color space are different from that of the reference color space.

6. The image processing apparatus according to claim 1, wherein the threshold value is a color difference or a hue difference between a specific color signal of the input color space and a corresponding specific color signal of the reference color space.

7. The image processing apparatus according to claim 6, further comprising:
   a generation unit that generates a color characteristic conversion coefficient that converts the input image data of the input color space into the output image data of the output color space, based on the input color space and a color space of an image reproducing apparatus that reproduces the input image data, in response to the judgment unit judging that the differences are not equal to or less than the predetermined threshold value.

8. The image apparatus according to claim 6, wherein the threshold value is defined for each of the reference color characteristics.

9. The image processing apparatus according to claim 6, wherein the specific color signal of the input color space is formed of a combination of saturation signals of respective color components constituting the input image data.

10. The image processing apparatus according to claim 9, wherein the threshold value is set for each combination of the saturation signals of the color components constituting the input image data.

11. The image processing apparatus according to claim 6, further comprising:
   a correction unit that corrects a gradation characteristic of the input color space, if the input color space is different in primary color gradation characteristic from the reference color space.

12. An image reproducing system comprising:
   an image processing apparatus according to claim 1; and
   an image reproducing apparatus that outputs the output image data.

13. A non-transitory computer-readable medium storing a program causing a computer to execute image processing, the image processing comprising:
   judging whether differences between primary-color chromaticity points of an input color space of input image data and corresponding primary-color chromaticity points of reference color characteristics of a reference color space are equal to or less than a predetermined threshold value; and
   converting the input image data of the input color space into output image data of an output color space using reference color conversion coefficients for a reference color characteristic having the differences equal to or less than the predetermined threshold value that convert image data of the reference color space to image data of the output color space, in response to judging that the differences are equal to or less than the predetermined threshold value.

14. An image processing apparatus comprising:
   a memory that stores first color conversion coefficients that convert image data of a first reference color characteristic of a color space into image data of an output color space and second color conversion coefficients that convert image data of a second reference color characteristic of the color space into image data of the output color space;
   a processor that determines first differences between primary-color chromaticity points of input image data of an input color space and corresponding primary-color chromaticity points of the first reference color characteristic of the color space, determines second differences between the primary-color chromaticity points of the input image data and corresponding primary-color chromaticity points of the second reference color characteristic of the color space, determines one of (i) the first reference color characteristic of the color space as being a matching reference color characteristic of the color space if the first differences are smaller than a threshold value that is a maximum deviation between primary-color chromaticity points and (ii) the second reference color characteristic of the color space as being the matching reference color characteristic of the color space if the second differences are smaller than the threshold value, and converts the input image data of the input color space into output image data of the output color space using the first or second reference color conversion coefficients of the matching reference color characteristic of the color space in response to determining the one of the first reference color characteristic of the color space and the second reference color characteristic of the color space as the matching reference color characteristic of the color space.

* * * * *